No. 759,157. PATENTED MAY 3, 1904.
B. M. COFFEE.
VARIABLE TRANSMISSION GEARING.
APPLICATION FILED DEC. 10, 1902.
NO MODEL. 2 SHEETS—SHEET 1.
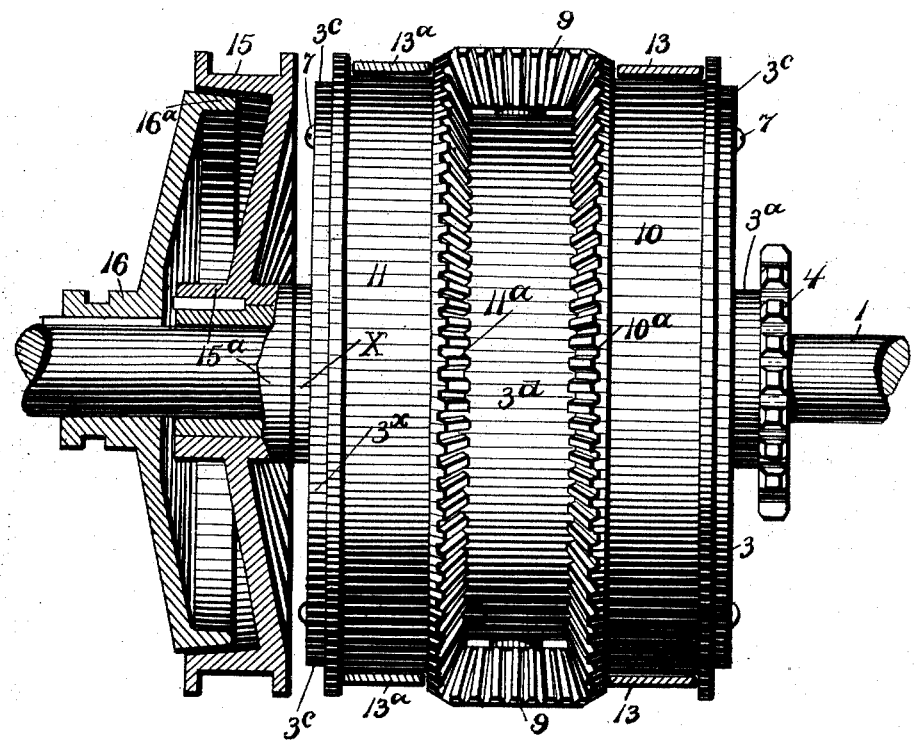
WITNESSES:
Guy V. Worthington
John T. Schrott
INVENTOR
B. M. Coffee,
BY
Fred G. Dieterich & Co.
ATTORNEYS.

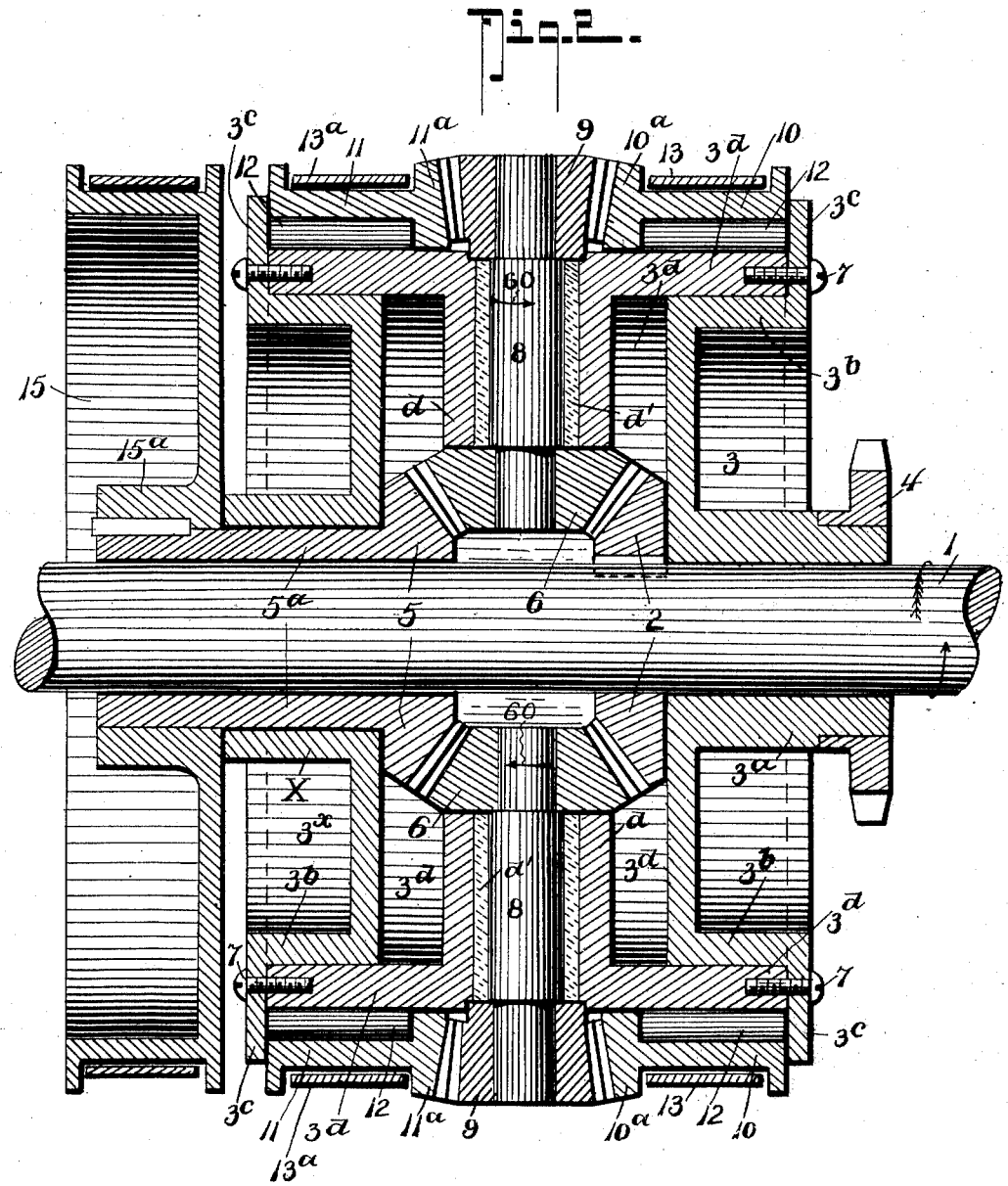

No. 759,157. Patented May 3, 1904.

UNITED STATES PATENT OFFICE.

BASSETT M. COFFEE, OF RICHMOND, VIRGINIA, ASSIGNOR OF ONE-FOURTH TO WILLIAM J. WHITEHURST, OF RICHMOND, VIRGINIA.

VARIABLE TRANSMISSION-GEARING.

SPECIFICATION forming part of Letters Patent No. 759,157, dated May 3, 1904.

Application filed December 10, 1902. Serial No. 134,657. (No model.)

*To all whom it may concern:*

Be it known that I, BASSETT M. COFFEE, residing at Richmond, in the county of Henrico and State of Virginia, have invented a new and Improved Variable Transmission-Gearing, of which the following is a specification.

My invention seeks to provide an improved construction of power-transmission gear mechanism, more especially adapted for use on motor-vehicles, of a simple and compact construction, wherein four speed changes can be secured in a convenient manner without sudden shock to the several coöperating gear devices and in which the action of varying the speed shall be both positive and effective.

This invention in its generic nature comprehends a peculiar construction of sprocket-carrying frame revolubly mounted on the main or drive shaft and a plurality of intermediate and independently-adjustable bevel-gear members adapted to be brought into direct connection with the drive-shaft, whereby to effect at the will of the operator a high speed forward, a low speed forward, a reverse low and an intermediate forward speed gradually and without shock or jar to the moving parts and without producing an irregular or twist strain on the several parts.

In its more subordinate features my invention embodies certain details of construction and peculiar combination of parts, all of which will hereinafter be fully explained, and specifically pointed out in the appended claims.

In order that my invention may be better understood, attention is directed to the accompanying drawings, which illustrate a conventional embodiment thereof and show the gearing as applied to a drive-shaft, which may be the drive-axle of any ordinary type of motor-vehicle.

In the drawings, Figure 1 represents a side elevation of my improved transmitting gear mechanism, parts being in section. Fig. 2 is a vertical longitudinal section thereof.

In the practical application of my invention the internal bevel-gears mounted upon and in close proximity to the drive-shaft 1 are held within a casing revolubly mounted upon the shaft 1, the peculiar construction of which is best shown in Fig. 2, and the several parts constituting the same will presently again be referred to.

Keyed upon the shaft 1 or otherwise made fast thereto is a bevel-gear 2, and adjacent the gear 2 is mounted one of the heads or ends 3 of the casing, and the said head 3 is formed with an integral outwardly-extending hub $3^a$, which engages the shaft 1 and carries the sprocket-wheel 4, keyed or otherwise secured on the outer extremity of the said hub $3^a$. 5 designates a second bevel-gear of the same diameter as gear 2, and said gear 5 has an integral sleeve or hub $5^a$, which loosely engages the shaft 1, and the said gear 5 opposes the gear 2 and meshes with the intermediate bevel or transmitting gear 6, of which there may be two or more, as desired, two being shown, and said gears 6 also mesh with the drive-gear 2. $3^x$ designates the other end or head member of the casing, which has a hub portion X loosely mounted on the sleeve $5^a$, that carries the gear 5, and the two hub members 3 and $3^x$ are circular shaped, of like diameters, and have annular horizontal rims $3^b$ $3^b$ and vertical flanges $3^c$ $3^c$ to receive the cylindrical closure or side portion $3^d$ of the casing, which is made fast to the hub or ends $33^x$ by the screw-bolts 7 7, that pass through the flanges $3^c$ $3^c$. The cylindrical casing member $3^d$ has a series of inwardly and radially projecting bearing-hubs $d$, that receive bearing metal sleeves $d'$, the number of said hubs $d$ depending upon the number of intermediate transmission-gears 6 6 employed. The gears 6 are mounted on the inner end of shafts 8, journaled in the sleeves $d'$, and each of said shafts 8 carries at the outer end a bevel-gear 9. The gears 9 9 mesh with the opposing annular bevel-gear rims $10^a$ $11^a$ of a pair of brake-drums 10 11, loosely mounted on the cylindrical portion $3^d$ of the casing, and to facilitate the travel of the said drums on the cylindrical body $3^d$ the bearing-face of the rims $10^a$ $11^a$ carry friction-rollers 12 12, as shown. The drums 10 11 have annular seats to receive the brake-bands 13 $13^a$, which may be manipulated in any well-known manner. 15 designates a third brake-band-receiving drum of preferably the same diameter as the drums 10 and 11, and the said drum 15 has a hub 15ᵃ to engage the sleeve 5ᵃ, that carries the gear 5, to which sleeve the hub 15ᵃ is keyed to turn therewith. The drum 15 is utilized for effecting a middle forward speed and for producing the high forward speed of the gear, and to effect the latter movement the said drum 15 is arranged to be brought into a direct connection with the drive-shaft 1, which may be accomplished by suitable clutch mechanism keyed on the shaft 1 and adapted to move into engagement with the drum 15 to interlock the same with the shaft 1. Any suitable clutch devices may be used for the purpose stated—for example, a sliding clutch-hub 16, keyed to the shaft 1 and having a cone-rim 16ᵃ to engage with an internal cone-surface on the brake-flange of the drum 15.

From the foregoing, taken in connection with the drawings, it is believed the complete construction of my invention will be readily apparent to those skilled in the art to which it appertains.

The manner in which the several parts are adjusted to effect the variable speeds before mentioned is best explained as follows: Motion being imparted to the shaft 1 in the direction indicated by the arrow and the brake applied to the drum 10 to hold it stationary, a slow forward speed is effected by reason of the gear 2 imparting motion to the gears 6 6 in the direction of arrow 60 60, which causes the gears 9 to turn in a like direction with gears 6 6 and to travel around the gear-rim 10ᵃ of the drum 10 and at the same time carry the casing in the same direction and with it the sprocket 4 at a low forward speed, it being understood that under the said operation of the parts referred to the gear 5, the parts carried thereby, and the drum 11 turn loosely with respect to the drive-shaft 1. To effect a slow reverse speed motion, the brake-band is applied on the drum 11, which is then held stationary, and the gears 6 and 9 now receive motion from the gear 2, as before; but by reason of the drum 11 being now stationary and the opposing drum 10 loose the gears 9 will be caused to travel in a direction on the bevel-rim 11ᵃ reverse to the movement of the shaft, and thereby carry the casing, with the sprocket 4, in a like reverse direction and at a slow or low speed. To obtain a high speed, the clutch devices 16 on the shaft 1 are moved into engagement with the drum 15, keyed to the sleeve 5ᵃ, and as the sleeve 5ᵃ carries the gear 5 the said gear now acts as a means for locking the gears 6 6 with the gear 2, whereby to cause the entire gear mechanism to rotate with the shaft 1 as a whole.

I deem it proper to say that the essential feature of my construction of gear mechanism lies in the convenient and positively-acting means for effecting an intermediate speed, a result impossible to obtain in most of the general run of speed-gear mechanisms now in use. This motion in my construction of gearing is obtained by applying the brake to the drum 15, whereby to hold the same stationary, and with it the gear 5. This being done, the motion of the shaft is imparted through the gear 2 to the gears 6, which, since the gear 5 is now immovable, travel around the said gear 5 and carry the casing with them, and thereby impart an intermediate speed to the sprocket, which speed when the parts are proportioned substantially as shown in Fig. 1 is one-half that of the speed of the shaft—one to two, as it were.

It will be noticed the several parts of my invention appear compactly arranged, and excepting the clutch devices for effecting high-speed motion, no shifting of the parts that are held in mesh is required, and hence torsional or twist strain on the said parts is reduced to the minimum.

The advantages for producing an intermediate speed is manifest to those familiar with motor-vehicles, and this movement, as also the other movements, is effected by reason of the peculiar correlation of the several parts in such manner that the strain and wear upon the actuating parts are evenly distributed, and in consequence thereof the life of the gear is enormously increased.

While I prefer to assemble the several parts in the manner shown and described, it is manifest that they may be readily modified or varied without departing from the scope of the appended claims.

Having thus described my invention, what I claim, and desire to secure by Letters Patent, is—

1. A variable-speed gearing, comprising a drive-shaft, a sprocket-carrying casing revolubly mounted thereon, a drive-gear fixedly mounted on the shaft, intermediate gear devices mounted on the casing controlled by the movement of said drive-gear, a bevel-gear loosely mounted on the shaft and opposing the fixedly-held drive-gear, and a means for holding the said loosely-mounted gear stationary, for the purposes specified.

2. A variable-speed gear, comprising a drive-shaft and a drive-gear fixedly mounted thereon; in combination with a casing revolubly mounted on the drive-shaft, a gear opposing the drive-gear loosely mounted on the shaft and having movement independent of the casing, a pair of opposing brake-equipped drums mounted on the casing, each having an annular gear-rim, means for preventing rotation of the said drums, shafts radially mounted on the casing, said shafts each carrying a beveled gear at the inner end held to mesh with the opposing fixed and loose gears on the shaft, and having a beveled gear at the outer end held in mesh with the gear-rims of the opposing drums, a drive-sprocket carried by the casing, a brake-drum keyed to the loosely-mounted drive-gear on the shaft, a brake-band for coöperating with said last-named drum, said drum having a clutch-face and a clutch mechanism on the shaft for engaging said face, for the purposes described.

3. A variable-speed gearing, comprising a drive-shaft; a beveled gear fixedly held thereon, an opposing bevel-gear loosely mounted thereon, a casing revolubly mounted on the shaft, an axial drive-sprocket carried on the casing, a series of gear-carrying shafts radially journaled on the inner side of the casing, a bevel-gear on the inner end of each of said shafts held to mesh with the fast and loose gears on the shaft, a pair of independent brake-drums mounted on the casing for independent operation, said drums having opposing beveled gear-rims, means for preventing rotation of the said drums, a bevel-gear on the outer end of each of the radial shafts held to mesh with the opposing bevel gear-rims on the drums, the loose gear on the drive-shaft having a sleeve and a brake-drum fixedly mounted on said sleeve, and a brake-band for coöperating with said last-named brake-drum, substantially as shown and described.

4. In a gearing for motor-vehicles and the like; the combination with the drive-shaft, a primary drive-gear fixedly mounted thereon, a casing revolubly mounted on the drive-shaft, a pair of drums loosely mounted on the casing, said drums having opposing gear-rims, means to prevent rotation of said drums, shafts carried by the casing, each having a gear at the inner end held to mesh with the primary gear, and a gear at the outer end held to mesh with the opposing gear-rims of the two drums, a secondary bevel-gear loosely mounted on the shaft and held to mesh with the gears on the inner ends of the casing-carried shafts, and means for holding the said secondary gear immovable whereby to effect an intermediate speed movement of the gearing, as set forth.

5. In a variable-speed gearing, the combination with the shaft, the driving-gear 2 fixedly held thereon and the gear 5 loosely mounted thereon, said gear having a sleeve $5^a$; of the casing revolubly mounted on the shaft and the sleeve $5^a$, a series of radially-projected shafts on the casing, a bevel gear 6 on the inner end of each of said radial shafts, held to mesh with the gears 2 and 5, a pair of drums 10 and 11 loosely mounted on the casing and provided with opposing bevel-gear faces, means to prevent rotation of said drums, the gears 9 engaging said faces and mounted on the outer end of the radially-projecting shafts, the brake-drum 15 mounted on and fixedly connected with the sleeve $5^a$, said drum having a clutch-receiving face and a clutch mechanism mounted on the drive-shaft, a brake-band for coöperating with said brake-drum 15, all being arranged substantially as shown and for the purposes described.

BASSETT M. COFFEE.

Witnesses:
  FRED G. DIETERICH,
  IRENE A. DIETERICH.